Nov. 3, 1931.   L. L. DOLLINGER   1,830,099
HEATING AND COOLING SYSTEM
Filed Aug. 5, 1929   2 Sheets-Sheet 2

INVENTOR
LEWIS L. DOLLINGER
BY
ATTORNEY

Patented Nov. 3, 1931

1,830,099

UNITED STATES PATENT OFFICE

LEWIS L. DOLLINGER, OF ROCHESTER, NEW YORK

HEATING AND COOLING SYSTEM

Application filed August 5, 1929. Serial No. 383,759.

This invention relates to cooling and heating systems for buildings and has for its various objects:

To provide intake ducts that are incorporated in the construction of the building whereby air passing through them may be cooled or heated prior to its entrance into the circulating system.

To provide means whereby the difference in the temperature between the atmosphere and the ground during warm weather is utilized to cool the circulating air within the building.

To provide means whereby the difference in the temperature between the ground and the atmosphere during cold-weather is utilized to raise the temperature of the air taken into the heating system to increase the efficiency of the heating system.

To provide means whereby air is automatically cooled in its entrance into the building and forced through the building by suitable circulating means to cool the interior of the building.

These and other objects of this invention will be apparent from the drawings, the specification and the appended claims forming a part thereof.

In the accompanying drawings:

Figure 1 is a vertical sectional view of the lower part of a building employing a hot air heating system. in which the air for the heating system is drawn through suitable ducts in the floor to cool the air entering the heating system in warm weather and distributed throughout the building, said ducts also serving to raise the temperature of the air entering the heating system in the winter time to increase the efficiency of the heating system.

In the several figures of the drawings like reference numerals indicate like parts.

Figure 1:
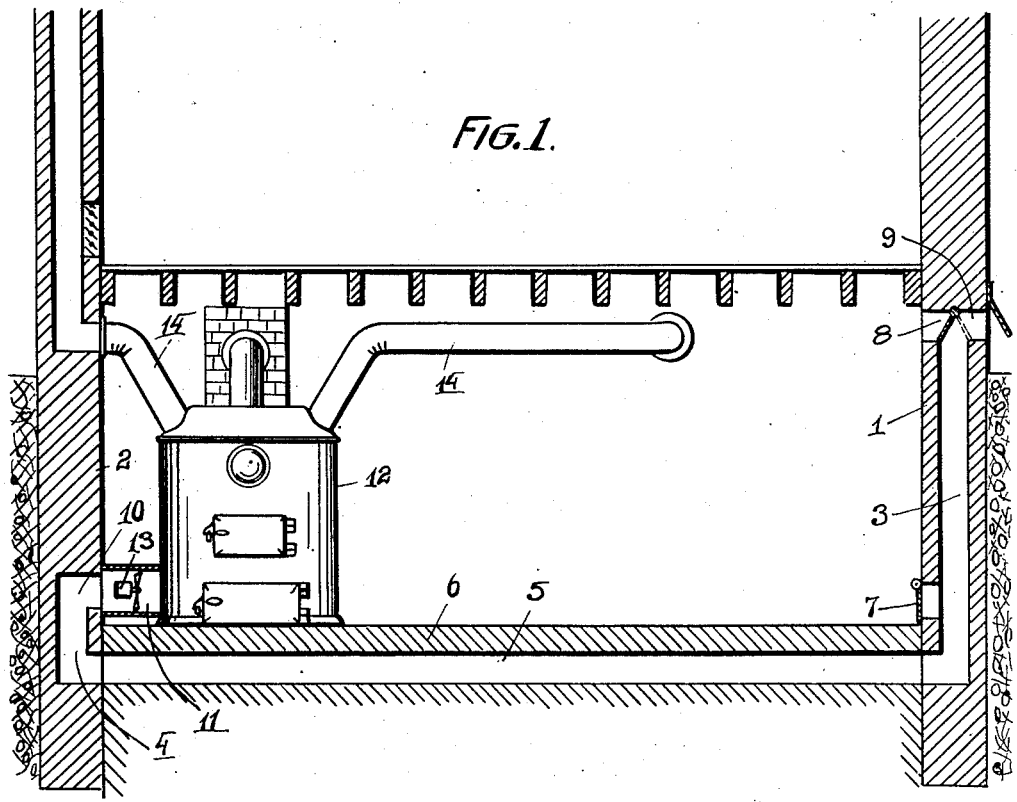

In my present invention the temperature of the ground surrounding the walls of the cellar and below the floor of it is utilized to act as a cooling medium in the summer time and heating medium in the winter time, by means of which the temperature of the air entering the building is automatically raised or lowered. For this purpose the side walls 1 and 2 of the cellar are provided with the vertical ducts 3 and 4 which are connected with each other by means of the horizontal ducts 5, 5 provided in the floor 6 of the cellar.

Vertical duct 3 in the side wall of the cellar has three inlets, 7, 8 and 9 of which inlet 7 is located near the floor of the cellar on the inside thereof, while duct 8 is located near the ceiling of the cellar, also on the inside thereof. Inlet 9, however, is located on the outside of the cellar and leads into the open to permit air from the outside of the building to enter the duct. All of the inlets are provided with suitable valves by means of which the inlets may be closed so that air may be drawn from only one of the inlets at a time.

The vertical duct 4 in the opposite side wall of the cellar is provided with an outlet 10 which is connected to the cold air intake 11 of the hot air furnace 12. A fan 13 may be mounted in the cold air inlet in order to draw air from the duct 4 and force it into the jacket of the furnace from where it is distributed throughout the building by means of the furnace pipes 14, 14. In this way air taken into the cold air inlet of the furnace is forced through the furnace jacket and out through the registers in the rooms that are connected with the furnace jacket by means of the furnace pipes.

In the summer time the difference between the temperature of the atmosphere surrounding the building and the temperature in the cellar is marked and this is due to the fact that the ground surrounding the sides of the cellar and the ground below the cellar bottom has a considerably lower temperature than the air above ground. This fact is utilized by providing the ducts 3, 4 and 5 in close proximity to the ground in order to keep them cool. When, therefore, air is drawn through the ducts from the outside of the building through the inlet 9, this air is cooled in its passage through the duct and enters the cold air inlet of the furnace at a temperature far below the temperature of the atmosphere surrounding the building. The furnace obviously is not fired up in the summer but serves merely as a connecting link in the cooled air circuit. The whole of the building is thus constantly supplied with fresh cool air that is cooled without the aid of a cooling agent other than cool ground surrounding the cellar of the building.

Should the temperature of the atmosphere be too high, the already cooled air in the cellar may be drawn through the inlets 7 or 8 or both of them into the ducts 3, 4 and 5. The temperature of the air in the cellar is thus still further reduced in its passage through the ducts and delivered to the rooms in the cooled state.

Figure 2:
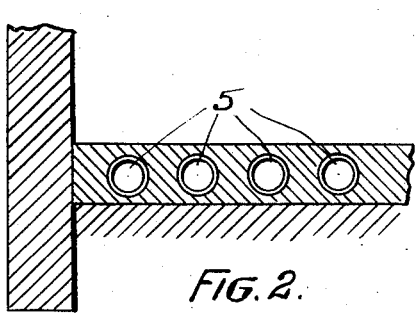
Figure 2 is a detailed sectional view of a portion of the floor of the cellar through which the air is drawn into the heating system.
Figure 3:
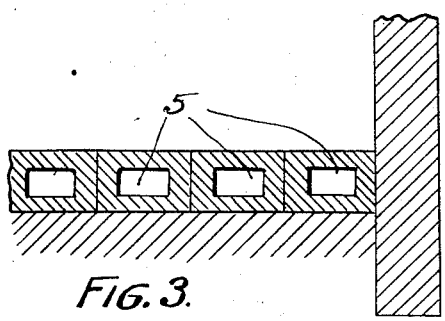
Figure 3 is a detailed sectional view of a modified form of the floor illustrated in Figure 2.

In Figure 2 I have illustrated a section of a floor of the cellar in which the ducts 5, 5 are cast into it in the form of parallel pipes. In Figure 3 a similar cross section of the floor shows the floor made up of a series of concrete blocks that are laid side by side so that central openings through them form parallel horizontal ducts through which the air can pass from one vertical duct to the other.

Figure 4:
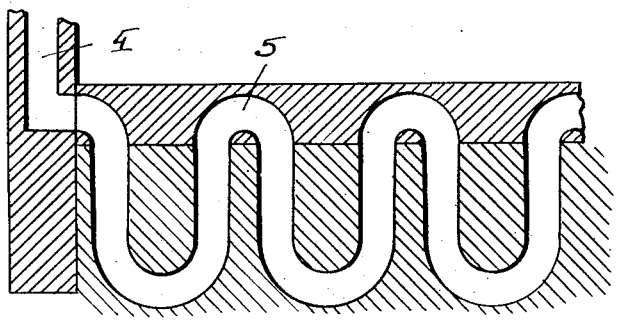
Figure 4 is a sectional view of a portion of the cellar bottom and side wall adjacent thereto in which a modified form of the air duct is incorporated.

In the modification of the ducts illustrated in Figure 4 short lengths of vertical pipes are embedded below the floor of the cellar and are connected at the top and bottom to provide a continuous vertical serpentine path for the air to travel below the floor of the cellar from one side wall to the other of it. The length of the duct is thus considerably increased resulting in a more efficient cooling of the air passing therethru.

Figure 5:
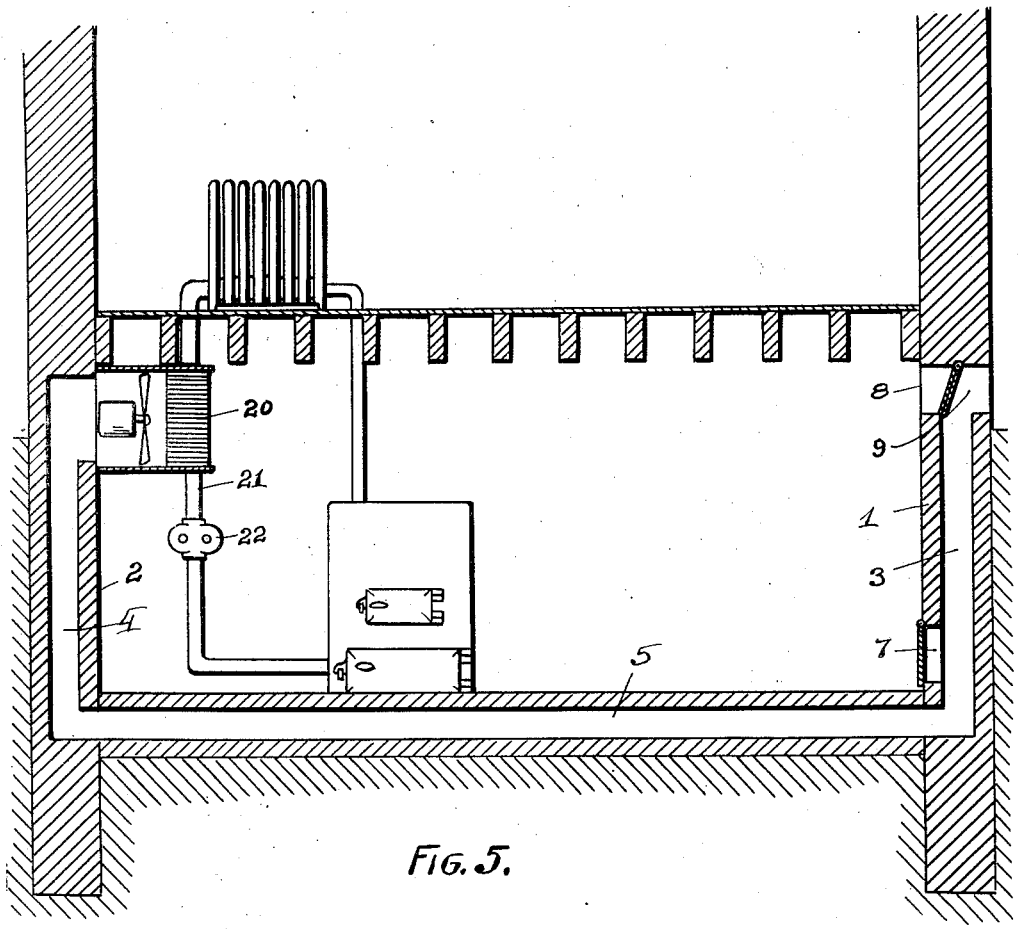
Figure 5 is a vertical sectional view of the lower part of a house employing a hot water system in which the cooled air entering the building is utilized to cool the water in the summer time and circulate the cooled water through the radiators to cool the interior of the house.

In Figure 5 I have shown the cooling system applied to a hot water system. In the application of the cooling system to this type of heating system the air from the cooling ducts is forced through a radiator 20, which is connected in series with the return pipe of the water circulating system. The water returning from the radiators is thus cooled as it passes through the radiator and after it is cooled is pumped back through the boiler into the radiators by means of a suitable pump 22. In this way cold water is circulated in the radiators and the rooms cooled in consequence of it.

Figure 6:
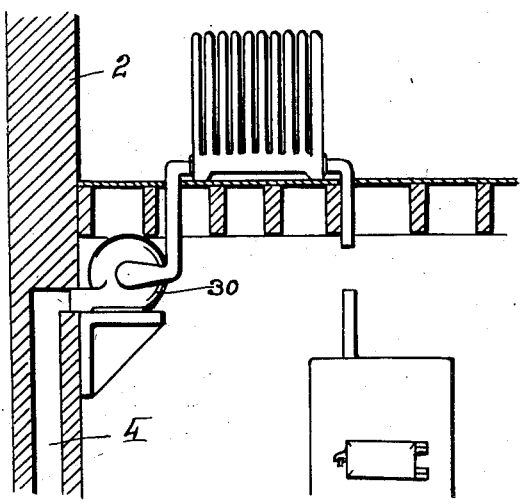
Figure 6 is a detailed sectional view of a portion of a house having a hot water, vapor or steam heating system in which the water, vapor or steam is replaced by cooled air that is automatically cooled and then forced through the radiators.

In the modification of this system illustrated in Figure 6, the boiler is disconnected from the circulating system and to one of the pipes is connected a blower 30, which takes the cooled air from the cooling ducts and forces it through the radiators to cool the rooms.

So far I have described the ducts as forming a cooling medium for cooling air in the summer time for the purpose of cooling the interior of the building. In the winter time when the temperature of the atmosphere surrounding the house is considerably lower than the temperature of the ground, the temperature of the air drawn through the ducts is raised before it reaches the cold air inlet of the furnace thus increasing the efficiency of the heating system by pre-warming the air before it enters the furnace jacket.

I claim:

1. In a cooling and ventilating system for building having a cellar below the level of the ground surrounding the building, the combination of a vertical duct in opposing walls of said cellar, a horizontal duct in the floor of said cellar and connecting said vertical ducts, an inlet into one of said ducts from the inside of the cellar, a second inlet into the same vertical duct from the outside of the building above the ground, means for closing either one or the other of said inlets, and an outlet in the vertical duct of the opposite wall.

2. In a cooling and ventilating system for building having a cellar below the level of the ground surrounding the building, the combination of a vertical duct in opposing walls of said cellar, a horizontal duct in the floor of said cellar and connecting said vertical ducts, an inlet into one of said ducts from the inside of the cellar, a second inlet into the same vertical duct from the outside of the building above the ground, means for closing either one or the other of said inlets, and an outlet in the vertical duct of the opposite wall, means for drawing air through all of said ducts and means for lowering the temperature within the building by means of the air cooled in said ducts.

3. In a building having a heating system and a cellar below the ground surrounding the building, the combination of a vertical duct in two of the walls surrounding the cellar below the ground, a horizontal duct connecting the vertical ducts in said walls, an inlet from said cellar into the vertical duct of one of said walls and an outlet from the vertical duct in the other wall and means connecting the outlet of said duct with the heating system of the building to preheat the heating medium of said heating system with the air taken from said ducts.

LEWIS L. DOLLINGER.